United States Patent
Al-Qaq et al.

(10) Patent No.: US 8,913,694 B2
(45) Date of Patent: Dec. 16, 2014

(54) FAST LO LEAKAGE CALIBRATION OF DIRECT UP-CONVERSION TRANSMITTERS USING THREE MEASUREMENTS

(71) Applicant: MStar Semiconductor, Inc., Hsinchu Hsien (TW)

(72) Inventors: Wael Al-Qaq, Oak Ridge, NC (US); Dennis Mahoney, Greensboro, NC (US)

(73) Assignee: MStar Semiconductor, Inc., Hsinchu Hsien (TW)

( * ) Notice: Subject to any disclaimer, the term of this patent is extended or adjusted under 35 U.S.C. 154(b) by 103 days.

(21) Appl. No.: 13/705,466

(22) Filed: Dec. 5, 2012

(65) Prior Publication Data

US 2014/0153618 A1 Jun. 5, 2014

(51) Int. Cl.
*H03C 3/00* (2006.01)
*H04B 1/04* (2006.01)

(52) U.S. Cl.
CPC .................................. *H04B 1/0475* (2013.01)
USPC ............. 375/302; 375/298; 375/296; 455/73; 455/126; 455/114.2; 455/115.1

(58) Field of Classification Search
USPC ............................... 375/298; 455/114.2, 115.1
See application file for complete search history.

(56) References Cited

U.S. PATENT DOCUMENTS

| | | | |
|---|---|---|---|
| 6,704,551 B2 * | 3/2004 | Riou et al. | 455/115.1 |
| 7,280,805 B2 | 10/2007 | Xu et al. | |
| 7,657,236 B2 | 2/2010 | Pan | |
| 7,856,048 B1 | 12/2010 | Smaini et al. | |
| 8,718,577 B1 * | 5/2014 | Smidth | 455/114.2 |
| 2003/0174783 A1 * | 9/2003 | Rahman et al. | 375/298 |
| 2006/0094377 A1 * | 5/2006 | Pan | 455/127.1 |
| 2006/0252392 A1 * | 11/2006 | Beamish et al. | 455/126 |
| 2010/0233971 A1 * | 9/2010 | Vassiliou et al. | 455/73 |

* cited by examiner

*Primary Examiner* — Eva Puente
(74) *Attorney, Agent, or Firm* — Edell, Shapiro & Finnan, LLC

(57) ABSTRACT

A direct conversion transmitter has a mixer stage to up-convert an input signal to the frequency of a local oscillator (LO). A DC offset circuit is coupled to an input signal port to apply a set of DC offset signal values. A processor determines a set of optimal DC offset signal values by no more than three differential spectral measurements made at the transmitter output port with a test signal applied at the input port. Optimal DC offset signal values are those that, when applied to the input signal at the input port of the transmitter, minimize an LO leakage component of the transmit signal at the output signal port of the transmitter. The optimal DC offset values are stored in memory and retrieved and applied to information bearing signals provided as the input signal once those optimal DC offset values have been determined.

19 Claims, 6 Drawing Sheets

| BAND | UARFCN | Pout | OOS WITHOUT LO LEAKAGE CALIBRATION | DCOC_I_LSB | DCOC_Q_LSB | OOS WITH PROPOSED THREE MEASUREMENT LO LEAKAGE CALIBRATION |
|---|---|---|---|---|---|---|
| BAND_A | 10087 | -28 | -39.17 | 0 | 2 | -50.14 |
| BAND_A | 10087 | -35 | -25.4 | -3 | 7 | -46.98 |
| BAND_A | 10087 | -42 | -18.19 | -5 | 16 | -37.15 |
| BAND_A | 10087 | -48 | -11.47 | -16 | 34 | -31.15 |
| BAND_F | 9500 | -28 | -36.5 | 0 | 2 | -54.61 |
| BAND_F | 9500 | -35 | -23.9 | -2 | 9 | -43.82 |
| BAND_F | 9500 | -42 | -16.58 | -6 | 20 | -41.59 |
| BAND_F | 9500 | -48 | -9.86 | -19 | 41 | -34.14 |

FIG.6

FAST LO LEAKAGE CALIBRATION OF DIRECT UP-CONVERSION TRANSMITTERS USING THREE MEASUREMENTS

TECHNICAL FIELD

The present disclosure relates to direct current (DC) offset calibration, e.g., local oscillator (LO) leakage in direct conversion transmitters.

BACKGROUND

Direct up-converter transmitters are used in various communication devices that employ time division synchronous code division multiple access (TD-SCDMA) and wideband code division multiple access (W-CDMA) modulation schemes. As is unfortunately typical in such transmitters, there is a local oscillator (LO) leakage component present at the output which degrades error vector magnitude (EVM) determination. There are typically two components that contribute to this LO leakage. First, differential signals generated in the baseband stages may be skewed, i.e., are not centered, and, when applied to a differential mixer, a DC offset in the up-converted signal is generated. This is referred to herein as carrier feed-through. The second source, referred to herein as direct LO leakage, is generated in the RF path to the transceiver transmit (Tx) output. DC offset correction between differential signals by onboard circuitry in the baseband circuit may be employed to remove the differential LO leakage component. However, efficient mechanisms for removing the direct LO leakage component, particularly those that are onboard the transmitter, remain elusive. Unfortunately, direct LO leakage is quite dominant at lower output power resulting in a higher error vector magnitude (EVM) at such lower output power.

A DC offset calibration procedure determines the amount of DC offset correction that is required for a given device and is typically performed at the point of manufacture. Often, onboard circuitry is incorporated to assist with the calibration procedure. To determine the optimal correction, one might sweep through possible I and Q DC offset values and monitor the measured LO leakage power relative to the desired output power until the LO leakage power is minimized. The problem with this approach is that it requires numerous measurements, the number of which is proportional to the granularity of I/Q DC offset steps that are swept through. Thus, there is a tradeoff between accuracy and calibration time.

Compounding the calibration time issue is that the sweeping of I/Q DC offset values must be carried out for each of several power levels, typically between −25 dBm and −55 dBm, and for each of several frequency bands. This is due to the fact that the magnitude and phase of the direct LO leakage component are dependent on transmitter gain and LO frequency. Since the overall time required to determine the correct LO leakage offset is a significant factor in manufacturing throughput, sweeping through potential DC offset values for each of several power levels and for each of several LO frequency levels is undesirable. Accordingly, the need is apparent for a direct LO leakage offset correction technique that is both accurate and requires as little calibration time as possible.

SUMMARY

A direct conversion transmitter has an input signal port to receive an input signal and an output signal port to output a transmit signal for transmission. The transmitter also has a mixer stage to up-convert an input signal to the frequency of a local oscillator (LO). A DC offset circuit is coupled to the input signal port to apply a set of DC offset signal values and a memory is provided to store the DC offset signal values. A processor determines an optimal set of the DC offset signal values by no more than three differential spectral measurements made at the transmitter output port with a test signal applied at the input port. Optimal DC offset signal values being those that, when applied to the input signal at the input port of the transmitter, minimize an LO leakage component of the transmit signal at the output signal port of the transmitter. The optimal DC offset values are stored in memory and retrieved and applied to information bearing signals provided as the input signal once those optimal DC offset values have been determined.

BRIEF DESCRIPTION OF THE DRAWINGS

FIG. 6 is a table illustrating example results of calibrating a TD-SCDMA transceiver by an embodiment of the present general inventive concept.

DESCRIPTION OF EXAMPLE EMBODIMENTS

Figure 1:
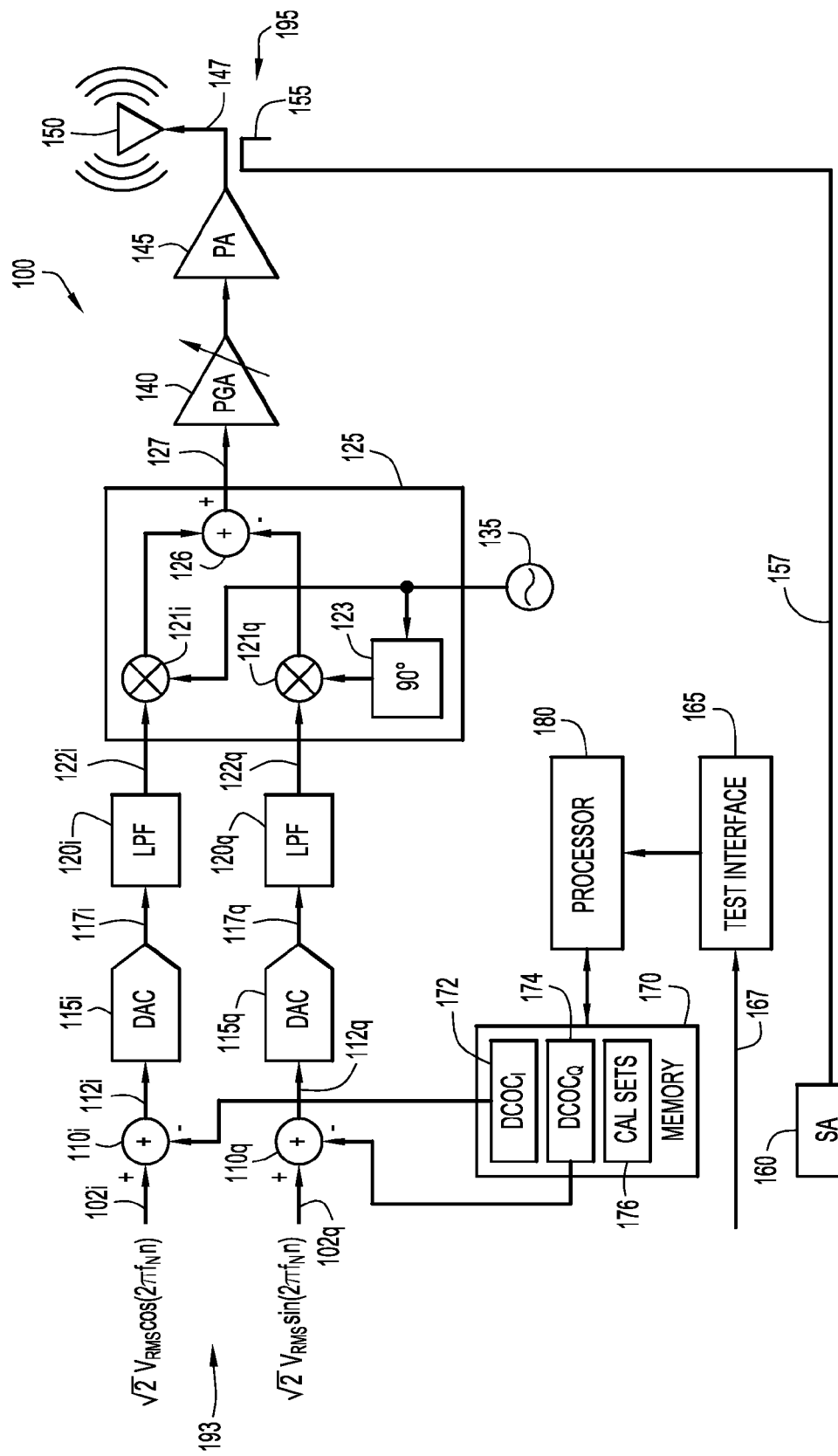
FIG. 1 is a schematic block diagram of an exemplary direct conversion transmitter implementing a calibration circuit by which the present invention can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, mathematical expressions are contained herein and those principles conveyed thereby are to be taken as being thoroughly described thereby. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

The figures described herein include schematic block diagrams illustrating various functional modules for purposes of description and explanation. Such diagrams are not intended to serve as electrical schematics and interconnections illustrated are merely to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

FIG. 1 is a schematic block diagram of an exemplary direct conversion transmitter circuit 100 by which the present invention can be embodied. It is to be understood that transmitter circuit 100 may be a part of a larger transmitter circuit; only those portions of which that are pertinent to the explanation of the present invention are illustrated in FIG. 1.

In-phase (I) and quadrature (Q) input signals 102$i$, 102$q$ at input signal port 193 are provided to adders 110$i$, 110$q$ at which respective DC offset correction (DCOC) values are provided, as is described below. In normal operation, signals 102$i$, 102$q$ carry information in a baseband frequency (BBF) or intermediate frequency (IF) for transmission over a communication network. The output of adders 110$i$, 110$q$, i.e., signals 112$i$, 112$q$ are provided to digital-to-analog converters (DACs) 115$i$, 115$q$ to convert digital signals 112$i$, 112$q$ into respective analog signals 117$i$, 117$q$, which, in turn are provided to low-pass filters (LPFs) 120$i$, 120$q$ for signal smoothing and noise reduction. Filtered signals 122$i$, 122$q$ are provided to mixer stage 125 whereby the signals 122$i$, 122$q$ are up-converted by local oscillator (LO) 135, mixers 121$i$, 121$q$ and phase shifter 123, and combined by adder 126 into signal 127. Signal 127 is amplified to a specified level by programmable gain amplifier (PGA) 140 and amplified again to transmission levels by power amplifier 145. The transmission signal 147 is provided through output signal port 195 to antenna 150 by which the signal is transmitted.

For purposes of calibration, an I/Q test signal is provided as signals 102$i$, 102$q$ and offset values are varied, as described below, at adders 110$i$, 110$q$. The response to the offset value variations are monitored in the transmission signal 147, such as through a suitable coupler 155. The coupled signal 157 may be provided to test equipment, such as signal analyzer 160. A suitable test interface 165 may provide access from external test equipment, which may provide a signal 167 that establishes the DC offset signal values. Test interface 165 may be coupled to a processor 180 that stores DC offset correction values DCOC$_I$ and DCOC$_Q$ in memory locations 172 and 174, respectively, of memory 170. Processor 180 may use several values of DCOC$_I$ and DCOC$_Q$, during a calibration procedure, where such different values form what are referred to herein as calibrations sets, and provide each set to memory 170 as required. The stored values are applied to adders 110$i$, 110$q$. In certain embodiments, memory 170 includes a plurality of calibration sets 176 which are selected in a sequence defined by the calibration procedure. All components illustrated in FIG. 1, with the possible exception of signal analyzer 160, the mechanism providing signal 167 and the mechanism providing test input signal 102$i$, 102$q$, may be on-board the communication device in which transmitter 100 is incorporated, e.g., a cellular phone, tablet computer, laptop, etc.

In certain embodiments, the input signals 102$i$, 102$q$ are I and Q components of a constant tone signal, i.e.:

$$V_{in_I}(n) = \sqrt{2}\, V_{rms}\cos\left(2\pi\frac{f_{IF}}{f_S}n\right) = \sqrt{2}\, V_{rms}\cos(2\pi f_N n),$$

and $$V_{in_Q}(n) = \sqrt{2}\, V_{rms}\sin\left(2\pi\frac{f_{IF}}{f_S}n\right) = \sqrt{2}\, V_{rms}\sin(2\pi f_N n),$$

where $V_{rms}$ is the root-mean squared magnitude of an input calibration signal, $f_{IF}$ is the frequency of the calibration signal, $f_s$ is the sampling rate of the DACs, i.e., the number of samples per second, $f_N$ is the normalized frequency of the signal, and n is a sample index. Adder output signals 112$i$, 112$q$ thus have the respective forms:

$$V_{112i}(n) = \sqrt{2}V_{rms}\cos(2\pi f_N n) - DCOC_I, \text{ and}$$

$$V_{112q}(n) = \sqrt{2}V_{rms}\sin(2\pi f_N n) - DCOC_Q.$$

The transmitted signal is of the form:

$$V_{out}(t) \cong \sqrt{2}\, V_{RMS} G_{Tx}\cos(2\pi[f_{LO}+f_{IF}]t+\theta) + \qquad (1)$$
$$V_{LO}\cos(2\pi f_{LO}t+\varphi) - Mag_{DCOC} G_{Tx}\cos(2\pi f_{LO}t+\theta+\phi_{DCOC}),$$

where $G_{Tx}$ is the gain of the transmitter for a given output power, $\theta$ is the phase shift of the transmitted signal, and $V_{LO}$, $\phi$, and $f_{LO}$ are the signal level, phase shift and frequency of the LO leakage component, respectively. Additionally, $$Mag_{DCOC} = \sqrt{DCOC_I^2 + DCOC_Q^2}$$

and $$\phi_{DCOC} = \tan^{-1}\left(\frac{DCOC_Q}{DCOC_I}\right).$$

In Equation 1, the term $\sqrt{2}V_{RMS}G_{Tx}\cos(2\pi[f_{LO}+f_{IF}]t+\theta)$ is the desired output signal, the term $V_{LO}\cos(2\pi f_{LO}t+\phi)$ is the undesirable offset signal at the output of the transmitter and comprises both carrier feed-through and direct LO carrier leakage components, and the term $Mag_{DCOC}G_{Tx}\cos(2\pi f_{LO}t+\theta+\phi_{DCOC})$ is the DC offset correction component that is used to ameliorate the undesirable offset signal component.

Figure 2:
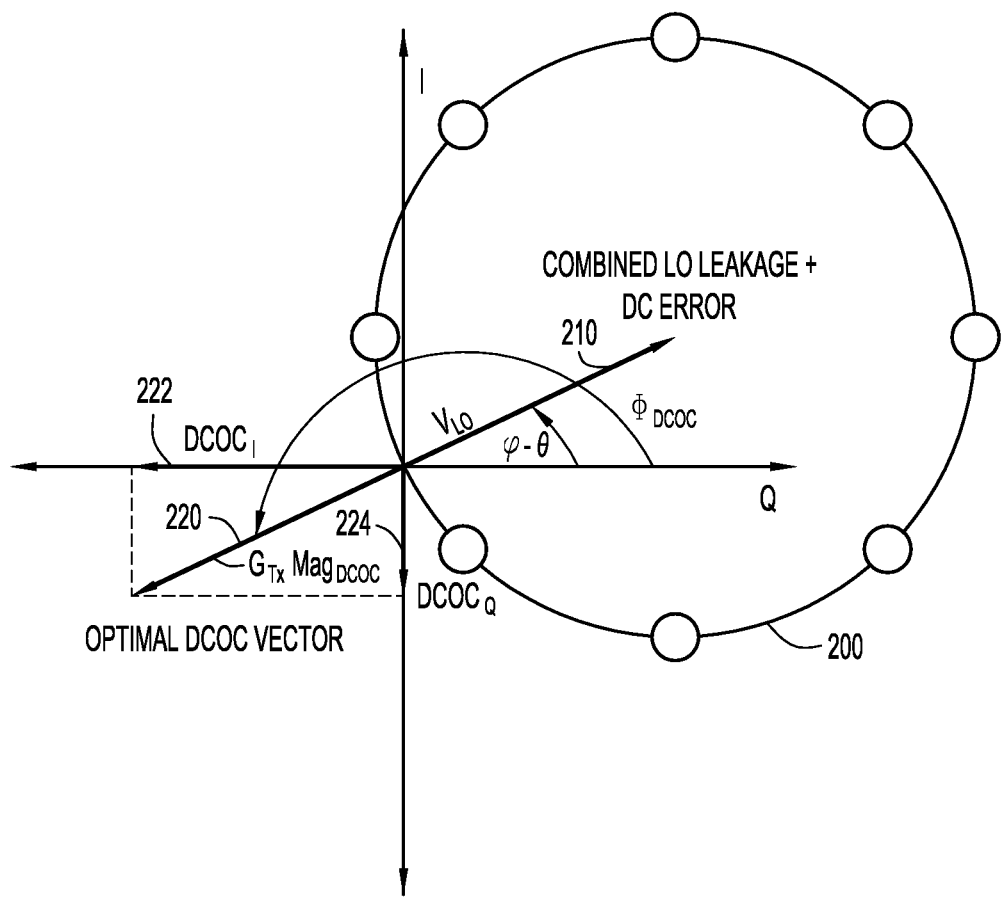
FIG. 2 is an illustration depicting the influence of the undesirable DC offset component on a symbol constellation and the desired outcome of the DC offset correction.

FIG. 2 is an illustration depicting the influence of the undesirable DC offset component on a symbol constellation 200 and the desired outcome of the DC offset correction. As illustrated in the Figure, constellation 200 is offset from the origin of the complex plane by a distance $V_{LO}$ and by an angle $(\phi-\theta)$, i.e., the difference in phase between the desired output signal and the undesirable offset signal. The constellation, however, must be centered on the origin for proper encoder decisions. Thus, the vector $\overrightarrow{G_{Tx}Mag_{DCOC}}$, representatively illustrated at vector 220, must be equal and opposite to the vector $\vec{V}_{LO}$, representatively illustrated at vector 210. As is apparent in FIG. 2, for optimum correction, $Mag_{DCOC,opt}=V_{LO}/G_{Tx}$ and $\phi_{DCOC,opt}=(\phi-\theta)+\pi$. Accordingly, the objective of an offset correction calibration procedure is to determine DC offset correction values $DCOC_{I,opt}$ and $DCOC_{Q,opt}$, representatively illustrated by vectors 222 and 224, respectively, that satisfy these optimality conditions.

Figure 3:
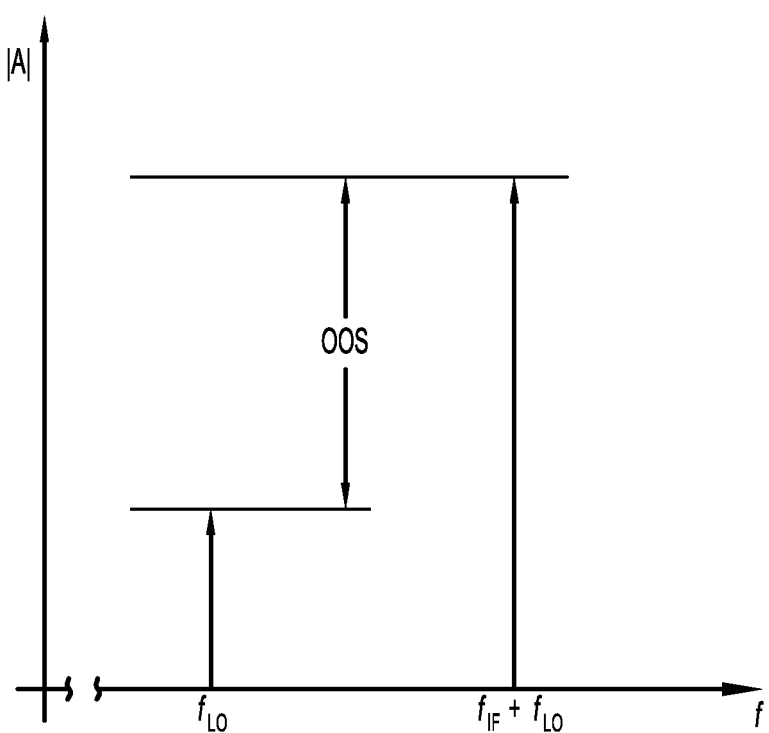
FIG. 3 is an illustration of a frequency spectrum illustrating origin offset suppression (OOS) measurement.

The present technique determines components $DCOC_{I,opt}$ and $DCOC_{Q,opt}$ using no more than three origin offset suppression (OOS) measurements, which, as used herein is the difference in decibels between the spectral power measured at the transmitter output at the transmit frequency $f_{IF}+f_{LO}$ and the spectral power measured at the transmitter output at the LO frequency $f_{LO}$. This difference is illustrated in FIG. 3. The OOS measurement is thus a differential measurement between two spectral features in the output signal. Such differential measurement can be made by suitable detection circuitry, such as spectral analyzer 160.

The OOS can be computed by:

$$OOS = 20\log\left(\frac{|G_{Tx}Mag_{DCOC}e^{j\Phi_{DCOC}} + V_{LO}e^{j(\varphi-\theta)}|}{|\sqrt{2}\,V_{rms}G_{Tx}e^{j\theta}|}\right). \quad (2)$$

The present invention determines the optimal $Mag_{DCOC,opt}$ and $\phi_{DCOC,opt}$ terms using no more than three differential measurements, e.g., OOS measurements, at the output of transmitter 100 with a calibration signal provided at the input of the transmitter. For each one of these three measurements, a different calibration set of values $DCOC_I$ and $DCOC_Q$ is applied to adders 110i, 110q.

It is to be understood that the choice of input tone, $DCOC_I$ and $DCOC_Q$ is completely arbitrary. The following example uses one possible set of values, but other test signals and/or offset values can be used. However, regardless of the test values of $DCOC_I$ and $DCOC_Q$ and the composition of the input tone, the optimal values by way of the present invention are unique across all configurations. The following example uses but one possible test set and the test tone described above.

Measurement 1, referred to herein as OOS1, is taken at the transmitter output with $DCOC_I=DCOC_Q=0$. From Eq. 2, $$OOS1 = 20\log\left(\frac{|V_{LO}e^{j\varphi}|}{|\sqrt{2}\,V_{rms}G_{Tx}e^{j\theta}|}\right) = 20\log\left(\frac{V_{LO}}{\sqrt{2}\,V_{rms}G_{Tx}}\right). \quad (3)$$

Given that, from the optimality criteria described above, $Mag_{DCOC,opt}=V_{LO}/G_{Tx}$, $$Mag_{DCOC,opt} = \frac{V_{LO}}{G_{Tx}} = \sqrt{2}\,V_{rms}10^{\left(\frac{OOS1}{20}\right)}. \quad (4)$$

Measurement 2, referred to herein is OOS2, is taken at the transmitter output with $DCOC_I=-Mag_{DCOC}$ (the algebraic negation of $Mag_{DCOC}$) and $DCOC_Q=0$, which is equivalent to $\phi_{DCOC}=\pi$. Under these conditions and from Eq. 2, $$OOS2 = 20\log\left(\frac{|V_{LO}e^{j\varphi} - V_{LO}e^{j\theta}|}{|\sqrt{2}\,V_{rms}G_{Tx}e^{j\theta}|}\right)$$

$$= 20\log\left(\frac{V_{LO}|e^{j(\varphi-\theta)} - 1|}{\sqrt{2}\,V_{rms}G_{Tx}}\right)$$

$$= OOS1 + 20\log(|e^{j(\varphi-\theta)} - 1|)$$

where the final step is derived from Eq. 3. Accordingly, $$|e^{j(\varphi-\theta)} - 1|^2 = 10^{\left(\frac{OOS2-OOS1}{10}\right)} \quad (5)$$

Or, $$\cos(\varphi-\theta) = 1 - \frac{10^{\left(\frac{OOS2-OOS1}{10}\right)}}{2}$$

From FIG. 2, $$\cos(\varphi-\theta) = \frac{DCOC_{I,opt}}{Mag_{DCOC,opt}}, \quad (6)$$

and, accordingly, $$DCOC_{I,opt} = Mag_{DCOC,opt}\cos(\varphi-\theta)$$

$$= Mag_{DCOC,opt}\left[1 - \frac{10^{\left(\frac{OOS2-OOS1}{10}\right)}}{2}\right]$$

Also from FIG. 2, $$\sin(\varphi-\theta) = \frac{DCOC_{Q,opt}}{Mag_{DCOC,opt}}, \quad (7)$$

and, accordingly, $$DCOC_Q = Mag_{DCOC,opt}\sin(\varphi-\theta)$$

$$= \pm Mag_{DCOC,opt}\sqrt{1 - \left[1 - \frac{10^{\left(\frac{OOS2-OOS1}{2}\right)}}{2}\right]^2}$$

$$= \pm\sqrt{Mag_{DCOC,opt}^2 - DCOC_{I,opt}^2}$$

Measurement 3, referred to herein is OOS3, is taken at the transmitter output with $DCOC_I=DCOC_{I,opt}$ and $DCOC_Q=+\sqrt{Mag_{DCOC,opt}^2 - DCOC_{I,opt}^2}$. The resulting measurement value is compared with a computed estimate of Eq. 2 with, $$DCOC_{I,opt} = Mag_{DCOC,opt}\cos(\varphi-\theta) = V_{LO}\cos(\varphi-\theta). \quad (8)$$

That is, $$OOS_{3T} = 20\log\left(\frac{V_{LO}|e^{j(\varphi-\theta)} - \cos(\varphi-\theta)|}{\sqrt{2}\,V_{rms}}\right)$$

$$= OOS1 + 20\log\left(\frac{|DCOC_Q|}{Mag_{DCOC}}\right).$$

$DCOC_{Q,opt}$ is determined from, $$DCOC_{Q,opt} = \begin{cases} +\sqrt{Mag_{DCOC,opt}^2 - DCOC_{I,opt}^2}, & OOS3 < OOS_{3T} \\ -\sqrt{Mag_{DCOC,opt}^2 - DCOC_{I,opt}^2}, & \text{Otherwise} \end{cases} \quad (9)$$

Figure 4:
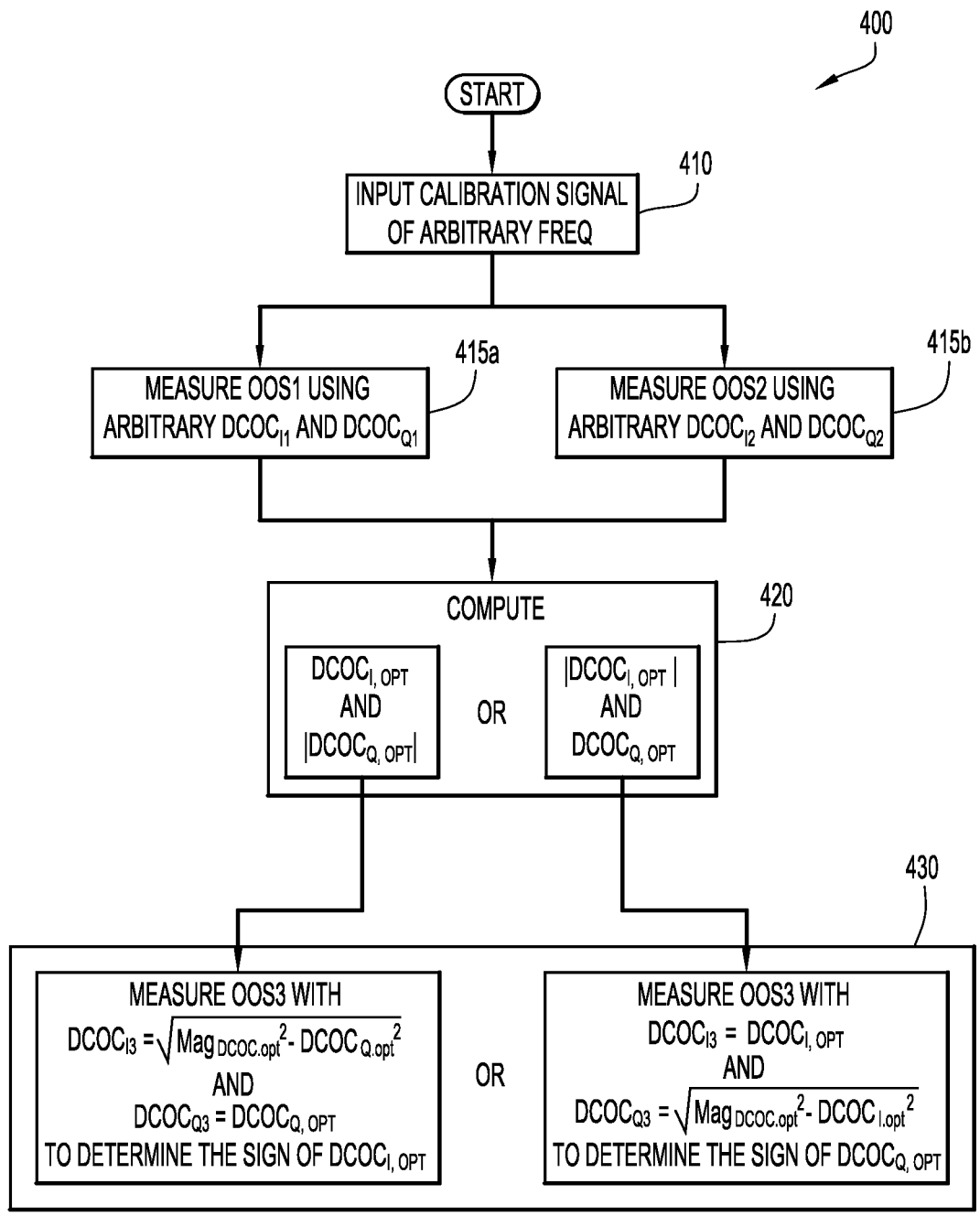
FIG. 4 is a flow diagram illustrating an exemplary calibration process by which the present general inventive concept can be embodied.

FIG. 4 is a flow diagram illustrating an exemplary calibration process 400. In operation 410, a calibration signal is provided at the input of transmitter 100. In operations 415a and 415b, the first two OOS measurements, i.e., OOS1 and OOS2, are taken using arbitrary offset values $DCOC_{I1}$, $DCOC_{Q1}$ and $DCOC_{I2}$, $DCOC_{Q2}$. The measurements OOS1 and OOS2 are used to compute $DCOC_{I,opt}$ and $|DCOC_{Q,opt}|$ or, inversely, to compute $|DCOC_{I,opt}|$ and $DCOC_{Q,opt}$, in operation 420. In operation 430, the third OOS measurement, i.e., OOS3, is used to determine the sign of the absolute value of $|DCOC_{Q,opt}|$ or $|DCOC_{I,opt}|$ and, therewith, a complete set of calibration parameters.

The choice of $DCOC_I$ and $DCOC_Q$ used to obtain a particular OOS measurement are completely arbitrary. In another approach embodying the present invention, three different sets of ($DCOC_I$, $DCOC_Q$) can be provided to obtain three OOS measurements. Using Eq. 2, an OOS model can be generated from the OOS measurements and the known sets of ($DCOC_I$, $DCOC_Q$). Optimal $DCOC_I$ and $DCOC_Q$ values can be obtained from the model.

Figure 5:
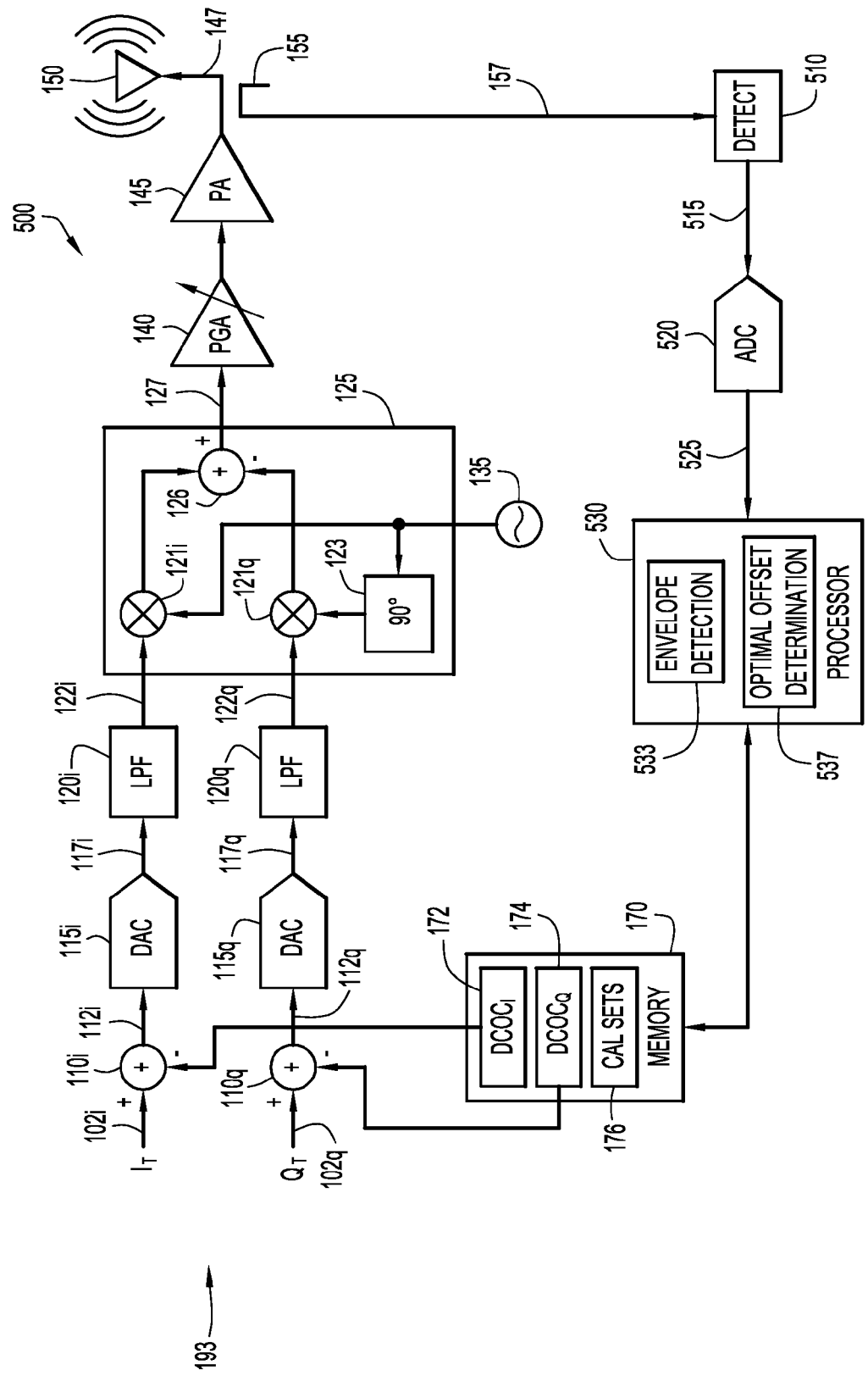
FIG. 5 is a schematic block diagram of a transmitter implementing another calibration circuit by which the present general inventive concept can be embodied.

FIG. 5 is a schematic block diagram of a transmitter 500 which is similar to transmitter 100 of FIG. 1. Accordingly, like components in both systems are referenced by like reference numerals in both figures and description of these components will not be repeated for the explanation of FIG. 5.

Transmitter 500 differs from transmitter 100 in that the calibration process is performed via circuitry entirely onboard the communication device in which the transmitter 500 is incorporated. For example, coupled output signal 157 may be provided to a suitable RF detector 510 that converts the output electromagnetic energy into a voltage signal 515. Voltage signal 515 is converted to a digital number sequence 525 by a suitable analog-to-digital converter (ADC) 520 which, in turn, is provided to processor 530.

Processor 530 may perform an envelope detection process 533 and an optimal offset determination process 537. Optimal offset determination process 537 generates sets of $DCOC_I$ and $DCOC_Q$ values and provides such to memory 170 and, in turn, provides the values to adders 110$i$, 110$q$ as described above. The resulting transmitter output is coupled as signal 157 and is converted to a digital sequence 525 via detector 510 and ADC 520. Signal 525 may be converted to a frequency representation, such as through a fast Fourier transform, and the spectrum is provided to envelope detection process 533. Envelope detection process 533 may determine the amplitude of the spectrum at frequencies $f_{LO}$ and $f_{LO}+f_{IF}$. Optimal offset determination process 537 may take the difference in the measured amplitudes to compute a corresponding OOS measurement. Once one OOS measurement has been completed, optimal offset determination process 537 generates another set of $DCOC_I$ and $DCOC_Q$ values and the process is repeated for another OOS measurement. Once all three OOS measurements have been completed, optimal offset determination process 530 can compute $DCOC_{I,opt}$ and $DCOC_{Q,opt}$ as described above, which are then stored in memory locations 172, 174, respectively.

Alternatively, processor 530 may perform a power calculation at the frequency $f_{Lo}$ while both of the components $I_T$ and $Q_T$ of the input signal are both set to zero (0). In this configuration, signal 157 comprises only DC offset components owing to differential and direct LO leakage. Processor 530 may then compute values for $DCOC_{I,opt}$ and $DCOC_{Q,opt}$ that offset the measured LO leakage power value using two more power measurements at the frequenccy $f_{LO}$ to minimize the numerator in Eq. 2 above.

FIG. 6 is a table illustrating example results of applying the above three measurement LO calibration procedure on a TD-SCDMA transceiver (bands A & F) and UTRA Absolute Radio Frequency Channel Numbers (UARFCN) 10087 and 9500, respectively (where UTRA is an acronym for UMTS Terrestrial Radio Access and UMTS is an acronym for Universal Mobile Telephony System). In certain typical communication standards used for mobile communications, the minimum OOS is required to be at least −30 dB and, as is illustrated in FIG. 6, this requirement is not met in the example system at reduced power levels. As shown in the table, the OOS is greatly increased after calibration, as one might expect. However, the OOS demonstrated through FIG. 6 is achieved through the exceedingly less labor intensive and less time consuming techniques of the present invention, as the ordinarily skilled artisan will readily appreciate upon review of this disclosure.

The ordinarily skilled artisan will recognize numerous variations of the present invention that can be realized without departing from the spirit and intended scope thereof. One variation may replace an I/Q IF test tone with an arbitrary I/Q test signal such as a cellular modulation signal, e.g. TD-SCDMA or W-CDMA modulation. In this case, the origin offset suppression measurement set may be taken in a manner similar to that described above, i.e., measuring power over the bandwidth of interest relative to the LO leakage power, and the three measurements described above can be used in a manner similar to that described above to determine the optimal I and Q DC offset correction components.

Processor instructions implementing the disclosed technique may be encoded on non-transitory computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions processor instructions that implement, for example, process 400 in FIG. 4, may be encoded and then subsequently retrieved, decoded and executed by a processor, where such media includes electrical, magnetic and optical storage devices. Examples of non-transitory computer-readable media include, but are not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present invention as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An apparatus comprising:
    a direct conversion transmitter in a communication device, the direct conversion transmitter comprising:
        an input signal port to receive an input signal;
        an output signal port to output a transmit signal at a transmit frequency for transmission;
        a mixer stage to up-convert a representation of the input signal to a local oscillator (LO) frequency of a LO coupled thereto; and
        a DC offset circuit to apply a set of DC offset signal values to the input signal;
    a memory to store the DC offset signal values; and
    a processor configured to:
        determine an optimal set of the DC offset signal values by at most three differential spectral measurements made at the transmitter output port with a calibration signal applied at the input port, the set of optimal DC offset signal values being those that minimizes a LO leakage component of the transmit signal at the output signal port of the transmitter when the set of optimal DC offset signal values are applied to the input signal at the input port of the transmitter;
        store the optimal set of DC offset values in the memory; and apply the stored optimal set of DC offset values to information bearing signals provided as the input signal subsequent to the determination of the set of optimal DC offset signal values.

2. The apparatus of claim 1, wherein the processor is further configured to:
select a first calibration set of the DC offset signal values and a second calibration set of the DC offset signal values, the first and second sets of the DC offset signal values each comprising an in-phase (I) offset value and a quadrature (Q) offset value;
perform a first differential spectral measurement using the first calibration set and a second differential spectral measurement using the second calibration set;
determine an I or Q offset value for the optimal set of DC offset signal values and an absolute value of the other of the I or Q offset value for the optimal set of DC offset signal values from the first and second differential spectral measurements;
select a third calibration set of the DC offset signal values that includes, as one of the values in third calibration set, the I or Q offset value for the optimal set of DC offset signal values determined from the first and second differential spectral measurements;
perform a third differential spectral measurement using the third calibration set; and
determine the algebraic sign of the absolute value of the other of the I or Q offset value for the optimal set of DC offset signal values from the third differential spectral measurement to obtain thereby a complete set of optimal I and Q offset values for the optimal set of DC offset signal values.

3. The apparatus of claim 2, wherein the first, second and third differential spectral measurements are origin offset suppression (OOS) measurements defined as a difference in decibels between spectral amplitude measured at the transmitter output signal port at the transmit frequency and spectral amplitude measured at the transmitter output signal port at the LO frequency.

4. The apparatus of claim 3 further comprising:
a detector coupled to the output signal port of the transmitter to convert an electromagnetic wave signal into a voltage signal;
an analog-to-digital converter to convert the voltage signal into a digital sequence; and wherein the processor is further configured to:
detect a spectral envelope of a frequency representation of the digital sequence; and
perform the first, second and third OOS measurements from the detected envelope of the frequency representation of the digital sequence.

5. The method of claim 4, wherein the processor is further configured to:
assign zero values to both the I and Q offset values as the first calibration set of the DC offset signal values;
perform the first OOS measurement with the first calibration set to determine an optimal vector magnitude value of an offset vector having the optimal I and Q offset values as component vector magnitudes;
assign the optimal offset vector magnitude, algebraically-negated, to the I or Q offset value of the second calibration set of DC offset signal values and zero to the other of the I or Q offset value of the second calibration set of DC offset signal values;
perform the second OOS measurement with the second calibration set to determine the optimal I or Q offset value and the absolute value of the optimal value of the other of the I or Q offset value;
assign the optimal I or Q offset value to the corresponding I or Q offset value of the third calibration set of DC offset signal values and a positive value of the absolute value of the optimal value the other of the I or Q offset value of the third calibration set of DC offset signal values;
perform the third OOS measurement with the third calibration set to determine the algebraic sign of the other of the optimal I or Q offset value to obtain thereby the complete set of the optimal I and Q offset values; and
store the optimal I and Q offset values in the memory.

6. The apparatus of claim 5, wherein the first, second and third calibration sets of the DC offset signal are stored in the memory; and wherein the processor is further configured to:
retrieve the stored first, second and third calibration sets of the DC offset signal values in a sequence corresponding to the respective first, second and third OOS measurements.

7. The apparatus of claim 1, wherein the calibration signal applied to the input port is of arbitrary composition.

8. The apparatus of claim 2, wherein the first, second and third calibration sets of the DC offset signal values are arbitrary and independent one from the other.

9. A method comprising:
providing a calibration signal to an input port of a transmitter of a communication device;
determining an optimal set of DC offset signal values by at most three differential spectral measurements made at an output port of the transmitter while the calibration signal is applied at the input port, the set of optimal DC offset signal values being those that minimizes a local oscillator (LO) leakage component of the transmit signal at the output signal port of the transmitter when the set of optimal DC offset signal values are applied to an input signal at the input port of the transmitter;
storing the set of optimal DC offset values in the memory; and
applying, to a DC offset circuit coupled to the input port of the transmitter, the stored set of optimal DC offset values to information bearing signals provided as the input signal subsequent to the determination of the optimal set of DC offset signal values.

10. The method of claim 9, wherein determining of the optimal set of DC offset signal values comprises:
selecting a first calibration set of the DC offset signal values and a second calibration set of the DC offset signal values, each of the first and second calibration sets of the DC offset signal values comprising an in-phase (I) offset value and a quadrature (Q) offset value;
performing a first differential spectral measurement using the first calibration set and a second differential spectral measurement using the second calibration set;
determining an optimal I or Q offset value for the optimal set of DC offset signal values and an absolute value of an optimal value of the other of the I or Q offset value for the optimal set of DC offset signal values from the first and second differential spectral measurements;
selecting a third calibration set of the DC offset signal values that includes, as one of the DC offset signal values in the third calibration set, the optimal I or Q offset value determined from the first and second differential spectral measurements;
performing a third differential spectral measurement using the third calibration set; and
determining the algebraic sign of the absolute value of the optimal value of the other of the I or Q offset value from the third differential spectral measurement to obtain thereby a complete set of the optimal I and Q offset values for the optimal set of DC offset signal values.

11. The method of claim 10, wherein the first, second and third differential spectral measurements are origin offset suppression (OOS) measurements defined as a difference in decibels between spectral amplitude measured at the transmitter output signal port at the transmit frequency and spectral amplitude measured at the transmitter output signal port at the LO frequency.

12. The method of claim 11 further comprising:
converting, by a detector in the communication device and coupled to the output port of the transmitter, an electromagnetic wave signal into a voltage signal;
converting, by an analog-to-digital converter, the voltage signal into a digital sequence;
detecting, by a processor in the communication device, a spectral envelope of a frequency representation of the digital sequence; and
performing, by the processor, the first, second and third OOS measurements from the detected envelope of the frequency representation of the digital sequence.

13. The method of claim 12 further comprising:
assigning zero values to both the I and Q offset values of the first calibration set of the DC offset signal values;
performing the first OOS measurement with the first calibration set to determine an optimal vector magnitude value of an offset vector having the optimal I and Q offset values as component vector magnitudes;
assigning the optimal offset vector magnitude, algebraically negated, to the I or Q offset value of the second calibration set of DC offset signal values and zero to the other of the I or Q offset value of the second calibration set of DC offset signal values;
performing the second OOS measurement with the second calibration set to determine the optimal I or Q offset value and the absolute value of the optimal value of the other of the I or Q offset value;
assigning the optimal I or Q offset value to the I or Q offset value of the third calibration set of DC offset signal values and a positive value of the absolute value of the optimal value the other of the I or Q offset value of the third calibration set of DC offset signal values;
performing the third OOS measurement with the third calibration set to determine the algebraic sign of the other of the optimal I or Q offset value to obtain thereby the complete set of the optimal I and Q offset values of the optimal set of DC offset signal values; and
storing the optimal I and Q offset values in a memory.

14. The method of claim 13, further comprising:
storing, in a memory in the communication device, the first, second and third calibration sets of the DC offset signal; and
retrieving the stored first, second and third calibration sets of the DC offset signal values in a sequence corresponding the respective first, second and third OOS measurements.

15. A tangible, non-transitory computer readable medium having encoded thereon processor instructions that, when executed by a processor coupled to a direct conversion transmitter in a communication device, where the direct conversion transmitter comprising an input signal port to receive an input signal, an output signal port to output a transmit signal for transmission, a mixer stage to up-convert a representation of the input signal to a frequency of a local oscillator (LO) coupled thereto, and a DC offset circuit to apply a set of DC offset signal values at the input signal port, configures the processor to:
determine an optimal set of the DC offset signal values by at most three differential spectral measurements made at the transmitter output port with a calibration signal applied at the input port, the set of optimal DC offset signal values being those that minimizes an LO leakage component of the transmit signal at the output signal port of the transmitter when the optimal set of DC offset signal values is applied to the input signal at the input port of the transmitter;
store the set of optimal DC offset values in a memory; and
apply the stored set of optimal DC offset values to information bearing signals provided as the input signal subsequent to the determination of the optimal set of DC offset values.

16. The tangible, non-transitory computer readable medium of claim 15 having processor instructions encoded thereon that configures the processor to:
select a first calibration set of the DC offset signal values and a second calibration set of the DC offset signal values, the first and second calibration sets of the DC offset signal values each comprising an in-phase (I) offset value and a quadrature (Q) offset value;
perform a first differential spectral measurement using the first calibration set and a second differential spectral measurement using the second calibration set;
determine an I or Q offset value for the optimal set of DC offset signal values and an absolute value of the other of the I or Q offset value for the optimal set of DC offset signal values from the first and second differential spectral measurements;
select a third calibration set of the DC offset signal values that includes, as one of the set, the optimal I or Q offset value determined from the first and second differential spectral measurements;
perform a third differential spectral measurement using the third calibration set; and
determine the algebraic sign of the absolute value of the other of the I or Q offset value for the optimal set of DC offset signal values from the third differential spectral measurement to obtain thereby a complete set of optimal I and Q offset values for the optimal set of DC offset signal values.

17. The tangible, non-transitory computer readable medium of claim 16, wherein the first, second and third differential spectral measurements are origin offset suppression (OOS) measurements defined as a difference in decibels between spectral amplitude measured at the transmitter output signal port at the transmit frequency and spectral amplitude measured at the transmitter output signal port at the LO frequency.

18. The tangible, non-transitory computer readable medium of claim 17 having processor instructions encoded thereon that configures the processor to:
detect a spectral envelope of a frequency representation of a digital sequence received from an analog-to-digital converter that converts a voltage signal generated by a detector coupled to the output port of the transmitter into the digital sequence; and
perform the first, second and third OOS measurements from the detected envelope of the frequency representation of the digital sequence.

19. The tangible, non-transitory computer readable medium of claim 18 having processor instructions encoded thereon that configures the processor to:

assign zero values to both the I and Q offset values as the first calibration set of the DC offset signal values;

perform the first OOS measurement with the first calibration set to determine an optimal vector magnitude value of an offset vector having the optimal I and Q offset values as component vector magnitudes;

assign the optimal offset vector magnitude, algebraically negated, to the I or Q offset value of the second calibration set of DC offset signal values and zero to the other of the I or Q offset value of the second calibration set of DC offset signal values;

perform the second OOS measurement with the second calibration set to determine the optimal I or Q offset value and the absolute value of the optimal value of the other of the I or Q offset value;

assign the optimal I or Q offset value to the corresponding I or Q offset value of the third calibration set of DC offset signal values and a positive value of the absolute value of the optimal value the other of the I or Q offset value of the third calibration set of DC offset signal values;

perform the third OOS measurement with the third calibration set to determine the algebraic sign of the other of the optimal I or Q offset value to obtain thereby the complete set of the optimal I and Q offset values; and store the optimal I and Q offset values in the memory.

* * * * *